United States Patent
Wang (10) Patent No.: US 9,607,523 B2
(45) Date of Patent: Mar. 28, 2017

(54) SYSTEMS AND METHODS FOR WEATHER INFORMATION MANAGEMENT

(71) Applicant: Honeywell International Inc., Morristown, NJ (US)

(72) Inventor: Haiming Wang, Beijing (CN)

(73) Assignee: Honeywell International Inc., Morris Plains, NJ (US)

( * ) Notice: Subject to any disclaimer, the term of this patent is extended or adjusted under 35 U.S.C. 154(b) by 0 days.

(21) Appl. No.: 14/833,435

(22) Filed: Aug. 24, 2015

(65) Prior Publication Data

US 2017/0061805 A1    Mar. 2, 2017

(51) Int. Cl.
| | |
|---|---|
| H04W 4/00 | (2009.01) |
| G08G 5/00 | (2006.01) |
| H04B 7/185 | (2006.01) |
| H04B 1/40 | (2015.01) |

(52) U.S. Cl.
CPC ......... *G08G 5/0091* (2013.01); *G08G 5/0013* (2013.01); *H04B 1/40* (2013.01); *H04B 7/18506* (2013.01); *H04W 4/00* (2013.01)

(58) Field of Classification Search
CPC ...... G08G 5/0091; G08G 5/0013; H04B 1/40; H04B 7/18506; G01S 13/953; G01S 7/003; G01S 13/89; G01S 13/951; H04W 4/00
USPC .......................................... 455/431; 342/268
See application file for complete search history.

(56) References Cited

U.S. PATENT DOCUMENTS

| | | | |
|---|---|---|---|
| 5,459,469 | A | 10/1995 | Schuchman |
| 6,043,756 | A | 3/2000 | Bateman et al. |
| 6,353,779 | B1 | 3/2002 | Simon et al. |
| 6,501,392 | B2 | 12/2002 | Gremmert et al. |

(Continued)

FOREIGN PATENT DOCUMENTS

| | | |
|---|---|---|
| EP | 1798872 | 6/2007 |
| EP | 2023685 | 2/2009 |

OTHER PUBLICATIONS

Airbus, "Flight Operations Briefing Notes", "Adverse Weather Operations Optimum Use of the Weather Radar", Feb. 2007, pp. 1-17, Publisher: Airbus.

(Continued)

*Primary Examiner* — Mong-Thuy Tran
(74) *Attorney, Agent, or Firm* — Fogg & Powers LLC (57) ABSTRACT

Systems and methods for weather information management are provided. In one embodiment, a method for weather information management comprises: determining at a ground based weather collection station when a first set of aircraft collected weather data is available for transfer from a first aircraft based on a new weather data disclosure message received from the first aircraft; determining whether the first set is cumulative to a second set of aircraft collected weather data based on the new weather data disclosure message; evaluating at least a first communication datalink for suitability for transferring the first set based on a data size indicated in the new weather data disclosure message; and when the first set is not cumulative and the first datalink is suitable: selecting the first communication datalink; and transmitting a weather data request in response to the new weather data disclosure message, the request indicating the first datalink.

20 Claims, 4 Drawing Sheets

(56) References Cited

U.S. PATENT DOCUMENTS

| | | | |
|---|---|---|---|
| 6,977,608 B1* | 12/2005 | Anderson | G01C 21/16 340/945 |
| 7,471,995 B1 | 12/2008 | Robinson | |
| 7,633,428 B1 | 12/2009 | McCusker et al. | |
| 8,121,593 B2 | 2/2012 | Pandit et al. | |
| 8,314,730 B1 | 11/2012 | Musiak et al. | |
| 8,344,933 B1 | 1/2013 | Kronfeld et al. | |
| 8,604,963 B1* | 12/2013 | Kronfeld | G01S 7/003 342/26 B |
| 8,811,265 B2 | 8/2014 | Horvath | |
| 2002/0039072 A1 | 4/2002 | Gremmert | |
| 2009/0012663 A1* | 1/2009 | Mead | G01W 1/10 701/14 |
| 2010/0087190 A1* | 4/2010 | Pandit | H04B 7/18506 455/431 |
| 2010/0245164 A1* | 9/2010 | Kauffman | G01S 7/22 342/26 B |
| 2010/0271239 A1* | 10/2010 | Kolcarek | G01W 1/00 340/971 |
| 2010/0302093 A1* | 12/2010 | Bunch | H04B 7/18506 342/26 B |
| 2013/0085669 A1* | 4/2013 | Bailey | G08G 5/0039 701/467 |

OTHER PUBLICATIONS

Phak, "Chapter 12 Aviation Weather Services", "Pilot's Handbook of Aeronautical Knowledge", Oct. 3, 2014, pp. 1-26, Publisher: Federal Aviation Administration.

Werth, "Airborne Weather Radar Limitations", "The Front", Dec. 2014, pp. 1-4, Publisher: National Weather Service.

European Patent Office, "Extended European Search Report from EP Application No. 16184789.2 mailed Jan. 26, 2017", "from Foreign Counterpart of U.S. Appl. No. 14/833,435", Jan. 26, 2017, pp. 1-11, Published in: EP.

* cited by examiner

SYSTEMS AND METHODS FOR WEATHER INFORMATION MANAGEMENT

BACKGROUND

For pilots of commercial and other aircraft, knowledge of weather data, in particular knowledge regarding hazardous weather along their planned route, is critical for safe operation of an aircraft. Presently, weather radar equipped onboard the aircraft is utilized to gather weather data for the flight path ahead. Further, in recent years, a connected radar concept has been proposed as the evolution of current weather radar system. Under the connected radar concept, weather information from various aircraft may be uploaded and downloaded and thus widely shared, increasing the amount and diversity of weather data available to the pilot. Such a system also benefits from the fact that weather information sensed by aircraft weather radar is typically more accurate than ground sensed weather data. One problem with the connected radar concept, however, is the potential additional heavy burden placed on air-ground communication datalinks. Commercial aircraft operations, in particular, are experiencing evolving and increasing utilization of air-ground communication datalinks for air traffic control, airline operations specific applications, and in-flight data services for passengers. Introduction of air-ground uploads and downloads of detailed weather information will only add to the burden of the wireless networks utilized by aircraft.

For the reasons stated above and for other reasons stated below which will become apparent to those skilled in the art upon reading and understanding the specification, there is a need in the art for alternate systems and methods for providing weather information management.

SUMMARY

The Embodiments of the present invention provide methods and systems for providing weather information management and will be understood by reading and studying the following specification.

Systems and methods for weather information management are provided. In one embodiment, a method for weather information management comprises: determining at a ground based weather collection station when a first set of aircraft collected weather data is available for transfer from a first aircraft based on a new weather data disclosure message received from the first aircraft; determining whether the first set of aircraft collected weather data is cumulative to a second set of aircraft collected weather data previously generated onboard a second aircraft based on the new weather data disclosure message; evaluating at least a first communication datalink for suitability for transferring the first set of aircraft collected weather data based on a data size indicated in the new weather data disclosure message; and when the first set of aircraft collected weather data is determined to be not cumulative and the first communication datalink is determined to be suitable: selecting the first communication datalink; and transmitting a weather data request in response to the new weather data disclosure message, the weather data request indicating that the first datalink is to be used to transmit the first set of aircraft collected weather data.

DRAWINGS

Embodiments of the present invention can be more easily understood and further advantages and uses thereof more readily apparent, when considered in view of the description of the preferred embodiments and the following figures in which.

In accordance with common practice, the various described features are not drawn to scale but are drawn to emphasize features relevant to the present invention. Reference characters denote like elements throughout figures and text.

DETAILED DESCRIPTION

In the following detailed description, reference is made to the accompanying drawings that form a part hereof, and in which is shown by way of specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the scope of the present invention. The following detailed description is, therefore, not to be taken in a limiting sense.

Embodiments of the present disclosure provide system and methods for weather information management that regulates the transfer of weather information from an aircraft to a ground station. On-board avionics sensor, such as weather-radar, temperature, pressure, and other sensors, are utilized to periodically collect weather data. When a new set of weather data is generated onboard an aircraft, the aircraft may send a new weather data disclosure message to the weather collecting ground station. From this new weather data disclosure, the ground station may then determine if it should transfer the full set of aircraft collected weather data. The decision to transfer the full set of aircraft collected weather data may be based on, for example, if the data is cumulative to data already in possession of the ground station. That is, a plurality of aircraft having similar flight path characteristics may be operating within the operating range of a ground based weather collection station. For example, the aircraft may each be operating within a pre-defined range of altitudes and along a same general heading. As such, a weather report from one of these aircraft would very likely have substantial overlap with a weather report from any other of these aircraft. If the ground station were to download the full set of aircraft collected weather data available from each of the aircraft in this set, the data would be largely cumulative. In other words, as the term is used herein a set of weather information deemed "cumulative" to a prior set of weather information is not necessarily identical to the prior set, but the proximity and similar headings of the aircraft generating the data being within certain thresholds strongly suggest the information from each has equivalent relevance and/or application to a specific region of the atmosphere. Transmission of this cumulative information would be a waste of datalink bandwidth, and would also require unnecessary storage and processing of duplicate data at the ground station. With the embodiments described herein, the ground station may determine for itself the usefulness of obtaining a full set of aircraft collected weather data from an aircraft and request its download if it is deemed to be useful. Further, the ground station may also further consider the current utilization and availability of datalinks for receiving the weather data before requesting the full set. That is, a first aircraft may send a new weather data disclosure message to the ground station and the ground station may conclude that having the full set of data would indeed be useful. However, the current status of datalinks may make transferring the full set undesirable (for example, due to the financial costs associated with currently available links or bandwidth margins associated with currently available links) or not possible (due to a lack of available bandwidth, for example). As such, the ground station may decline to transfer the full set of aircraft collected weather data from the first aircraft and instead wait to accept a full set of aircraft collected weather data from another aircraft.

Figure 1:
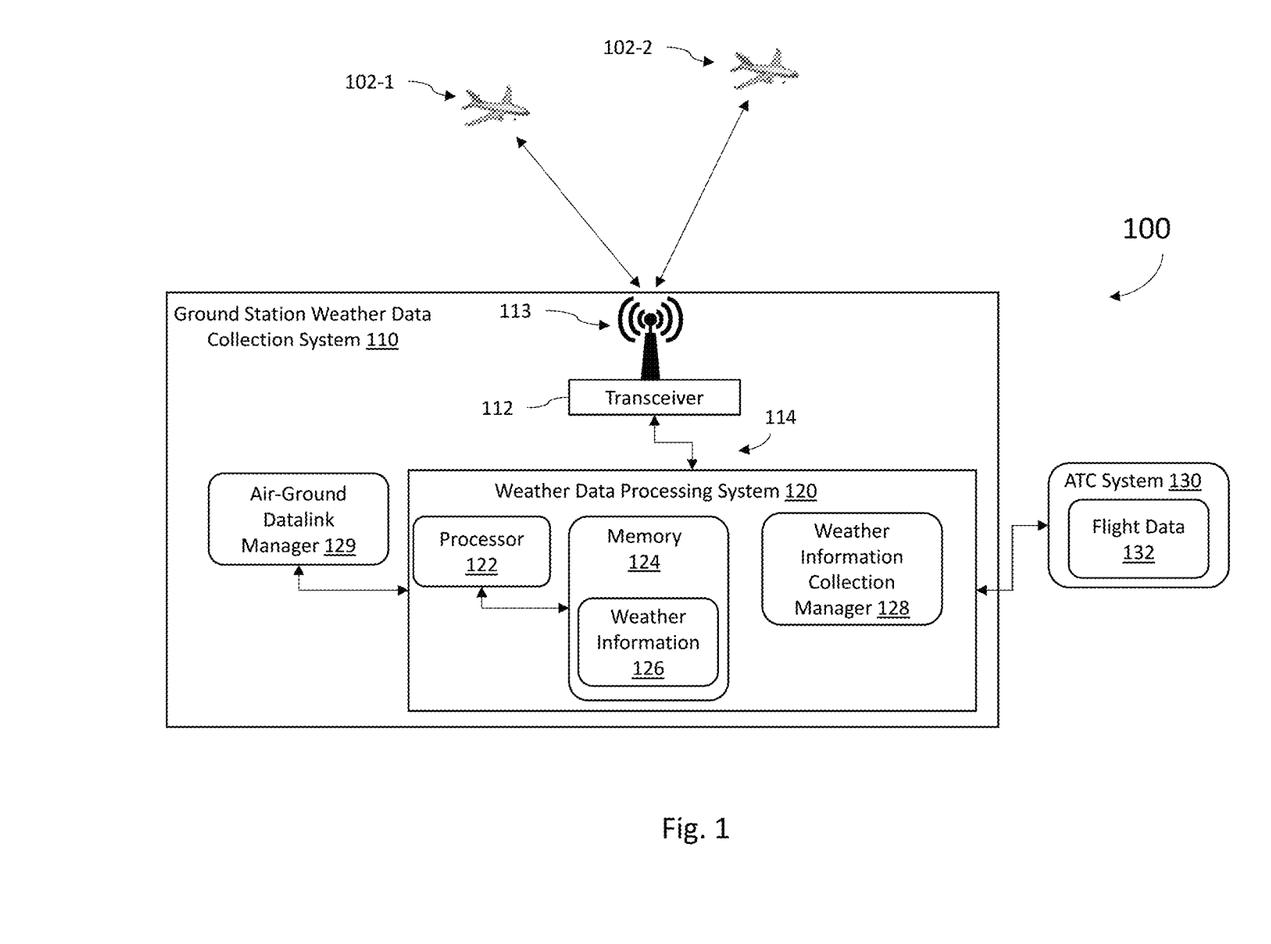
FIG. 1 is a diagram illustrating a Ground Based Weather Collection Station having a Weather Information Collection Manager of one embodiment of the present disclosure.

FIG. 1 is an illustration at 100 of one such Ground Station Weather Data Collection System 110 that implements weather information management according to one embodiment of the present disclosure. System 110 comprises at least one transceiver 112 coupled to a Weather Data Processing System 120. The at least one transceiver 112 is coupled to at least one antenna 113 and incorporates electronics and other components to establish bidirectional wireless data communications with avionics aboard aircraft (such as aircraft 102-1 and 102-2 shown in FIG. 1 and collectively referred to as aircraft 102). For example, in one implementation, transceiver 112 establishes one or more Aircraft Communications Addressing and Reporting System (ACARS) datalinks and/or satellite communications (SATCOM) datalinks between System 110 and aircraft 102. It should be appreciated that in alternate implementations, transceiver 112 and weather data processing system 120 may be located at the same physical ground facility or instead located at some remote distance from each other and connected by a communication link 114.

Weather data processing system 120 comprises at least one processor 122 coupled to a memory 124 which may be used for storing weather information 126 collected from, and shared with, aircraft 102. Also as shown in FIG. 1, weather data processing system 120 further comprises a Weather Information Collection Manager 128 according to one embodiment of the present disclosure which may be implemented as a computer executable function or module executed by processor 122.

Figure 2:
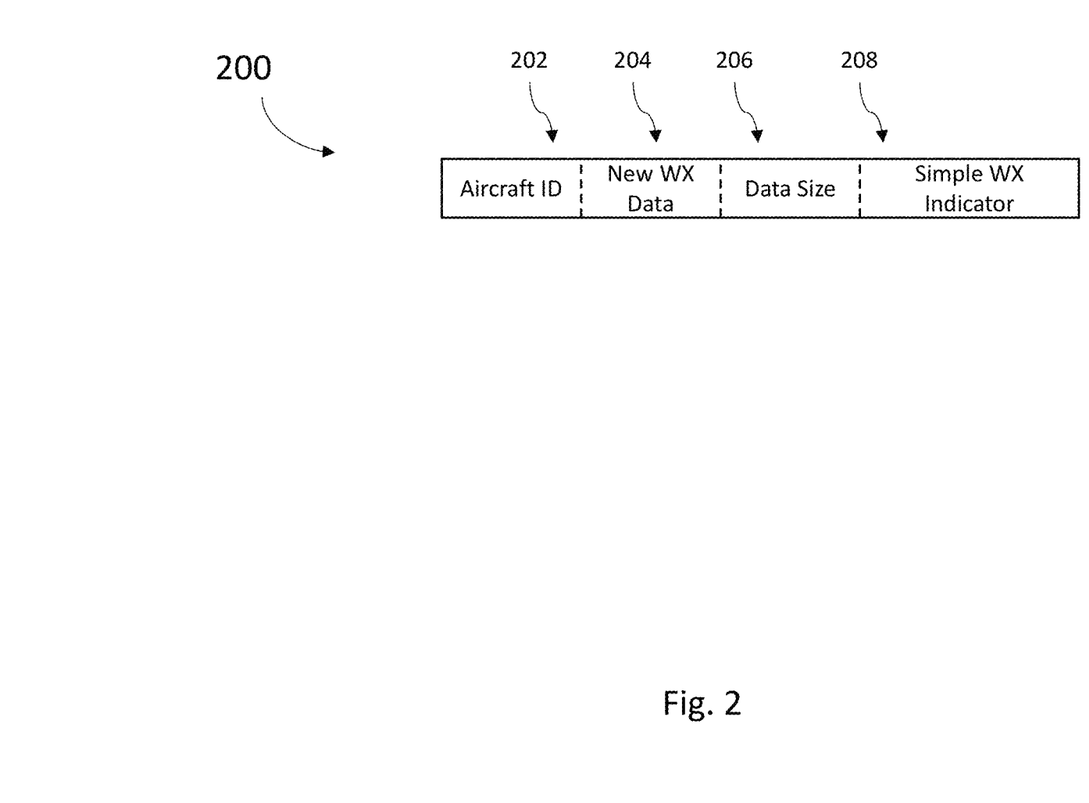
FIG. 2 is a diagram illustrating a new weather data disclosure message of one embodiment of the present disclosure.

In operation, when an aircraft 102 (such as 102-2) is within the operating range of System 110 and has generated a new set of aircraft collected weather data, it will wirelessly communicate a new weather data disclosure message to Weather Information Collection Manager 128 via transceiver 112. FIG. 2 is a diagram illustrating an example new weather data disclosure message 200 of one embodiment of the present disclosure transmitted by aircraft 102 to System 110, also referred to herein as a new data disclosure (NDD) message 200. NDD message 200 includes an aircraft ID field 202 which identifies the aircraft 102 from which NDD message 200 was received and a new weather (WX) data indicator field 204, which indicates that NDD message 200 is a new weather data disclosure message. At 206, message 200 includes a data size field. In one embodiment, data size filed indicates the data size of the full set of aircraft collected weather data available from the aircraft 102. In one embodiment, the data size indicated in field 206 may indicate the possible size of the available weather data and may also include the size of any weather data remaining in the weather information buffer of the aircraft. In the embodiment shown in FIG. 2, NDD message 200 also includes a simple weather indicator 208. Through simple weather indicator 208, NDD message 200 may convey a general weather summary, for example indicating that current conditions include, for example, rain, turbulence, limited visibility, ice etc.

In one implementation, each aircraft 102 can transmit an NDD message 200 to the Ground Station Weather Data Collection System 110 each time its on-board systems generates a new set of weather data using its on-board sensors. In other embodiments, the aircraft 102 may instead transmit an NDD message 200 upon entering the operating range of a new Ground Station Weather Data Collection System 110. Since the data volume of an NDD message 200 is relatively low, it can be transmitted as an inexpensive ACARS downlink message in an ACARS frequency, or alternatively over a wide-band datalink network if availability and cost considerations are favorable. In other embodiments, other message formats and/or datalinks may be utilized.

At the weather data processing system 120, the weather information collection manager 128 inputs the NDD message 200 received by system 120 via transmitter 112. Based on the aircraft ID field 202 and the new weather data indicator field 204, manager 128 is informed that an aircraft within its operating range has generated a new set of weather information and is also informed of the identity of that aircraft. In one implementation, by utilizing the aircraft ID field 202, manager 128 determines the aircraft position and heading information for an aircraft (for example aircraft 102-2) that sent the NDD message 200. For example, in one embodiment, weather data processing system 120 is coupled to an Air Traffic Control System 130 which maintains flight information 132 for each aircraft 102 including one or more of position, heading and flight plan information. In such an embodiment, upon receiving the NDD message 200, manager 128 may query the Air Traffic Control System 130 for the flight information 132 associated with the aircraft identified in the aircraft ID field 202 of the NDD message 200. In other implementations, the weather data processing system 120 may obtain aircraft position and heading information directly from aircraft, for example, by observing signals transmitted by aircraft.

In many circumstances, two or more aircraft 102 will be within the operating range of system 110 so that a previous aircraft (for example aircraft 102-1) has been in communication with system 110 before aircraft 102-2 transmits an NDD message 200. When the weather information collection manager 128 has previously received a set of aircraft collected weather data from the previous aircraft (i.e., aircraft 102-1) and the two aircraft 102-1 and 102-2 are within a predetermined range of each other and/or travelling with approximately same heading, then the weather information collection manager 128 may conclude that the weather information available from aircraft 102-2 is cumulative to the previously received weather information from aircraft 102-1. When that is the case, weather information collection manager 128 may 1) simply ignore the NDD message 200 from aircraft 102-2, 2) instruct weather data processing system 120 to transmit an acknowledgement message back to aircraft 102-2 but not a request to transfer the full data set, or 3) instruct weather data processing system 120 to transmit an acknowledgement message affirmatively declining the opportunity to transfer the full data set. In one embodiment, even if the two aircraft 102-1 and 102-2 are within the predetermined range of each other and/or travelling with approximately same heading, the weather information collection manager 128 may still conclude that the weather information available from aircraft 102-2 is likely noncumulative when the simple weather indicator 208 of the NDD message from aircraft 102-2 is inconsistent with the weather information (and/or the simple weather indicator 208) previously received from aircraft 102-1. For example, if weather data previously received from aircraft 102-1 indicates clear skies with no adverse weather detected, and the NDD message 200 from aircraft 102-2 has a simple weather indicator 208 that indicates storms and turbulence, weather information collection manager 128 would conclude that the aircraft collected weather data now available from aircraft 102-2 is likely noncumulative to what was previously received from aircraft 102-1.

In one embodiment, when the weather information collection manager 128 determines that useful noncumulative aircraft collected weather data is available (based on the information transmitted in the NDD message 200) it next evaluates the availability of datalink bandwidth to transmit the aircraft collected weather data. This evaluation is based at least in part on the data size associated with the aircraft collected weather data as indicated in NDD message 200 data size field 206. For example, if the volume of data that needs to be transmitted is small, then a relatively narrow-bandwidth network datalink (such as an ACARS datalink, for example) can be used. If instead the data volume is relatively large, then it could be transmitted over a wideband datalink. It should thus be noted that while NDD message and acknowledgements may be transmitted over one frequency (over ACARS for example), the detailed weather data can be transmitted over a different, potentially wider-band, frequency. The selection of datalink for transmitting the full set of aircraft collected weather data would also be based on the aircraft's own competence. For example, a request to transmit weather data can on a wide-band frequency would only be made when corresponding wide-band communications equipment is available on the specific aircraft.

In one embodiment, the weather information collection manager 128 queries an air-ground datalink manger 129 to determine which datalinks are available for use with aircraft 102-2 and determine an estimate of the time and/or financial costs involved in transferring aircraft collected weather data of the data size indicated in the NDD message 200. The weather information collection manager 128 may then select the specific datalink resource to use to transfer the aircraft collected weather data. If the current availability status of datalinks make transferring the full set undesirable (for example, due to the financial costs associated with currently available links exceeding predefined limits or limited bandwidth margins associated with currently available datalinks) or not possible (due to a lack of available bandwidth, for example), the weather information collection manager 128 may decline to transfer the full set of aircraft collected weather data and instead wait to accept aircraft collected weather data from another aircraft. Otherwise, weather data processing system 120 sends a weather request message for the full set of aircraft collected weather data to aircraft 102-2 over the selected datalink resource and aircraft 102-2 responds by transmitting the data over the selected datalink resource accordingly.

Figure 3A:
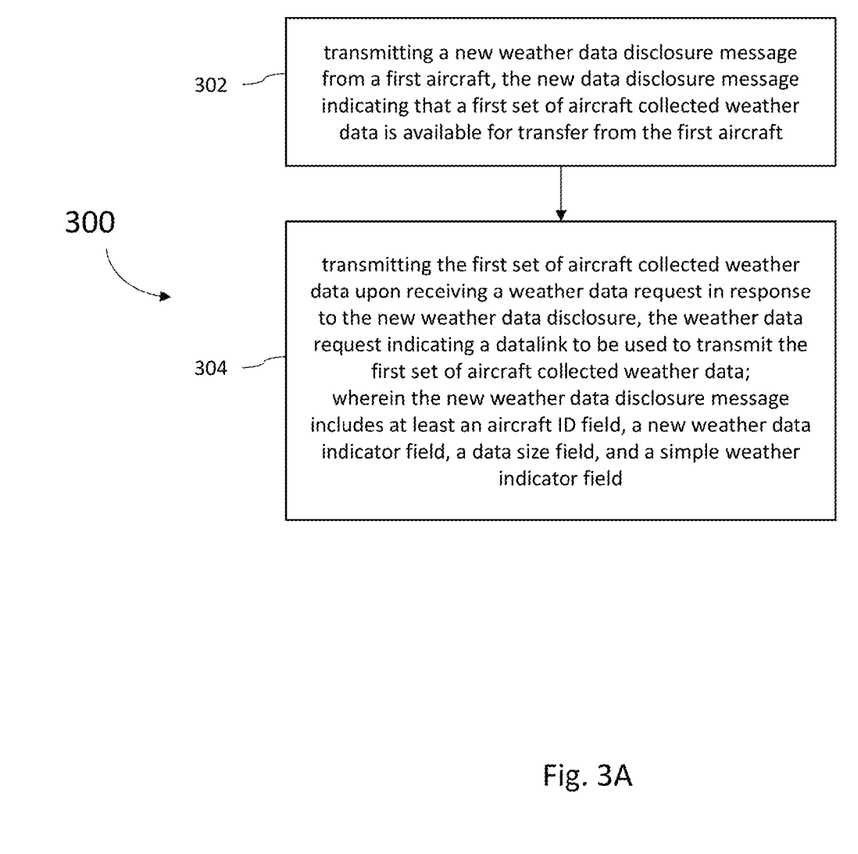
FIGS. 3A and 3B are flow charts illustrating method embodiments of the present disclosure.
Figure 3B:
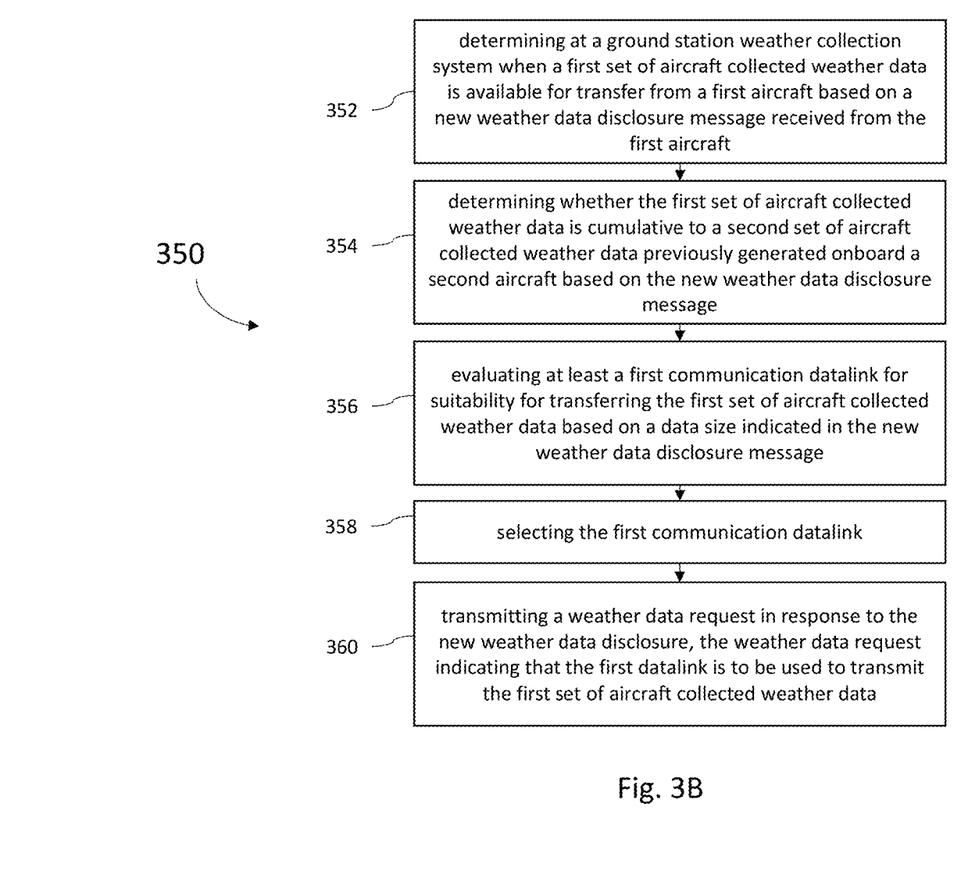

FIGS. 3A and 3B are flow charts illustrating the process described above as an example methods 300 and 350 for weather information management according to one embodiment of the present disclosure. It should be understood that methods 300 and 350 may be implemented using any one of the embodiments described above. As such, elements of methods 300 and 350 may be used in conjunction with, in combination with, or substituted for elements of the embodiments described above. Further, the functions, structures and other description of elements for such embodiments described above may apply to like named elements of methods 300 and 350 and vice versa. For example, in some implementations, elements of methods 300 and 350 may be separated into separate implementations—some implemented by avionics on an aircraft and others by electronic components at a ground based weather collection station In FIG. 3A, the method 300 begins at 302 with transmitting a new weather data disclosure message from a first aircraft, the new weather data disclosure message indicating that a first set of aircraft collected weather data is available for transfer from the first aircraft. As discussed above, the first set of aircraft collected weather data may either be a new set of aircraft collected weather data that has been generated using on-board weather sensors, or an existing set of aircraft collected weather data that is being offered to a new ground based weather collection station upon entering that station's operating range. The new weather data disclosure message includes at least an aircraft ID field, a new weather data indicator field, a data size field, and a simple weather indicator field. The aircraft ID field identifies the aircraft from which the NDD message was received. The new weather data indicator field identifies the message a new weather data disclosure message. In one embodiment, data size filed indicates the data size of the full set of aircraft collected weather data available for transfer and may also indicate the possible size of the available weather data and the size of any weather data remaining in the weather information buffer of the aircraft. The simple weather indicator field may convey a general weather summary, for example indicating that current conditions include, for example, rain, turbulence, limited visibility, ice etc. The method proceeds to 304 with transmitting the first set of aircraft collected weather data upon receiving a weather data request in response to the new weather data disclosure, the weather data request indicating a datalink to be used to transmit the first set of aircraft collected weather data.

The method 350 of FIG. 3B in some implementations may be, but is not necessarily, utilized in conjunction with method 300. In FIG. 3B, the method 350 begins at 352 with determining at a ground station weather collection system when a first set of aircraft collected weather data is available for transfer from a first aircraft based on a new weather data disclosure message received from the first aircraft. As mentioned above, the new weather data disclosure message may include at least an aircraft ID, a new weather data indicator, a data size field, and a simple weather indicator field.

The method proceeds to 354 with determining whether the first set of aircraft collected weather data is cumulative to a second set of aircraft collected weather data previously generated onboard a second aircraft based on the new weather data disclosure message. In one embodiment, using the aircraft ID field, the method at 354 further comprises determining an aircraft position and heading information for the first aircraft that transmitted the NDD message. For example, in one embodiment, a weather data processing system is coupled to an Air Traffic Control system that maintains flight information for tracked aircraft including one or more of position, heading and flight plan information. In such an embodiment, upon receiving the NDD message at 350, the method at 354 may query the Air Traffic Control System for the flight information associated with the first aircraft identified in the aircraft ID field. In other embodiments, position and/or heading information may be received directly from the aircraft that transmitted the NDD message.

In one implementation, when a set of aircraft collected weather data has been previously received from another aircraft and the first aircraft and the previous aircraft are within a predetermined range of each other and/or travelling with approximately the same general heading, then the method at 354 may conclude that the first set of aircraft collected weather data available from first aircraft is cumulative to the previously received weather information from previous aircraft. When that is the case, method may further comprise: 1) simply ignoring the NDD message from the first aircraft, 2) transmitting an acknowledgement message back to the first aircraft but not a request to transfer the full data set, or 3) transmitting an acknowledgement message affirmatively declining the opportunity to transfer the full data set. In one embodiment, even if the two aircraft are within a predetermined range of each other and/or travelling with approximately same general heading, the method at 354 may still conclude that the first set of aircraft collected weather data available from the first aircraft is noncumulative when the simple weather indicator of the NDD message from the first aircraft is inconsistent with the weather information previously received from the previous aircraft. For example, if weather data previously received from the previous aircraft indicates clear sky with no adverse weather detected, and the NDD message from the first aircraft indicates storms and turbulence, the method at 354 would conclude that the first set of aircraft collected weather data now available from the first aircraft is noncumulative.

When the first set of aircraft collected weather data is determined to be noncumulative, the method proceeds to 356 with evaluating at least a first communication datalink for suitability for transferring the first set of aircraft collected weather data based on a data size indicated in the new weather data disclosure message. This evaluation is based at least in part on the data size associated with the aircraft collected weather data as indicated in NDD message data size field. In one embodiment, evaluating suitability at 356 may include determining which of a plurality of datalinks are available for communicating with the first aircraft and estimating the time and/or financial costs involved in transferring the first set of aircraft collected weather data given the data size indicated in the NDD message. For example, when the volume of data needed to transmit the first set of aircraft collected weather data is small, then a relatively inexpensive narrow-bandwidth network datalink (such as an ACARS datalink, for example) would be suitable. If instead the data volume is relatively large, then it could be transmitted over a wide-band datalink.

When the current status of datalinks make transferring the full set not suitable at the present time, meaning that use of the datalinks are either undesirable (for example, due to the financial costs associated with currently available links or bandwidth margins associated with currently available links) or not possible (due to a lack of available bandwidth, for example), the method may decline to transfer the full set of aircraft collected weather data and instead wait to accept aircraft collected weather data from another aircraft.

When the evaluation determines that the first communication datalink is suitable for transferring the first set of aircraft collected weather data, the method proceeds to 358 with selecting the first communication datalink and to 360 with transmitting a weather data request in response to the new weather data disclosure, the weather data request indicating that the first datalink is to be used to transmit the first set of aircraft collected weather data.

As mentioned above, since the data volume of the NDD message might be low, it can be transmitted either over a narrow-band network such as an ACARS network or via another network, such as a wide-band network depending on the situation. The transmission of the actual first set of aircraft collected weather data need not be transmitted over the same network as the NDD message. For example, where the data volume of the first set of aircraft collected weather data is relatively large, the first communication datalink may be a higher bandwidth datalink than used to communicate the NDD message.

Example Embodiments

Example 1 includes a weather data collection system, the system comprising: at least one transceiver configured to communicate with aircraft via one or more datalinks; a Weather Data Processing System coupled to the at least one transceiver, the Weather Data Processing System comprising a processor coupled to a memory that stores weather information compiled from aircraft collected weather data; wherein the Weather Data Processing System further comprises a Weather Information Collection Manager coupled to the at least one transceiver and the memory; wherein the Weather Information Collection Manager is configured to process a new weather data disclosure message received from a first aircraft via the at least one transceiver to determine when the first aircraft has a first set of aircraft collected weather data available for transfer that is either cumulative or noncumulative with respect to weather information previously stored in the memory; wherein the Weather Information Collection Manager is further configured to process the new weather data disclosure message received from the first aircraft to determine whether a first datalink of the one or more datalinks is suitable for transferring the first set of aircraft collected weather data; and wherein when the first set of aircraft collected weather data is noncumulative and when the first datalink of the one or more datalinks is suitable for transferring the first set of aircraft collected weather data, the Weather Information Collection Manager is configured to cause the Weather Data Processing System to transmit a weather data request to the first aircraft in response to the new weather data disclosure.

Example 2 includes the system of example 1, wherein the weather data request requests the first aircraft to transmit the first set of aircraft collected weather data via the first datalink.

Example 3 includes the system of example 2, wherein the Weather Data Processing System stores the first set of aircraft collected weather data into the memory.

Example 4 includes the system of any of examples 1-3, wherein the Weather Information Collection Manager determines whether the first datalink is suitable for transferring the first set of aircraft collected weather data based on estimating one or both of a time and a financial costs to transfer the first set of aircraft collected weather data.

Example 5 includes the system of any of examples 1-4, wherein the new weather data disclosure message comprises: an Aircraft ID; a new weather data indicator; a data size field; and a simple weather indicator.

Example 6 includes the system of any of examples 1-5, wherein the Weather Information Collection Manager determines whether the first set of aircraft collected weather data is cumulative based on a proximity of the first aircraft with respect to a second aircraft that previously provided at least part of the weather information previously stored in the memory.

Example 7 includes the system of example 6, wherein the Weather Information Collection Manager determines whether the first set of aircraft collected weather data is cumulative further based on a comparison of a heading of the first aircraft with respect to a heading of the second aircraft.

Example 8 includes the system of any of examples 1-7, wherein the Weather Information Collection Manager determines whether the first set of aircraft collected weather data is cumulative based on a consistency of a simple weather indicator included with the new weather data disclosure message and weather information previously provided by a second aircraft that provided at least part of the weather information previously stored in the memory.

Example 9 includes the system of any of examples 1-8, wherein the new weather data disclosure message is communicated via a datalink having a narrower bandwidth than the first datalink.

Example 10 includes a method for weather information management, the method comprising: transmitting a new weather data disclosure message from a first a first aircraft, the new weather data disclosure message indicating that a first set of aircraft collected weather data is available for transfer from the first aircraft; and transmitting the first set of aircraft collected weather data upon receiving a weather data request in response to the new weather data disclosure, the weather data request indicating a first datalink to be used to transmit the first set of aircraft collected weather data; wherein the new weather data disclosure message includes at least an aircraft ID field, a new weather data indicator field, a data size field, and a simple weather indicator field.

Example 11 includes the method of example 10, wherein the new weather data disclosure message is communicated via a datalink having a narrower bandwidth than the first datalink.

Example 12 includes the method of any of examples 10-11, further comprising: generating the first set of aircraft collected weather data using on-board weather sensors; wherein the new weather data disclosure message is transmitted when generation of the first set of aircraft collected weather data is completed.

Example 13 includes a method for weather information management, the method comprising: determining at a ground station weather collection system when a first set of aircraft collected weather data is available for transfer from a first aircraft based on a new weather data disclosure message received from the first aircraft; determining whether the first set of aircraft collected weather data is cumulative to a second set of aircraft collected weather data previously generated onboard a second aircraft based on the new weather data disclosure message; evaluating at least a first communication datalink for suitability for transferring the first set of aircraft collected weather data based on a data size indicated in the new weather data disclosure message; and when the first set of aircraft collected weather data is determined to be not cumulative and the first communication datalink is determined to be suitable: selecting the first communication datalink; and transmitting a weather data request in response to the new weather data disclosure message, the weather data request indicating that the first datalink is to be used to transmit the first set of aircraft collected weather data.

Example 14 includes the method of example 13, wherein the new weather data disclosure message comprises: an Aircraft ID; a new weather data indicator; a data size field; and a simple weather indicator.

Example 15 includes the method of any of examples 13-14, wherein evaluating at least the first communication datalink for suitability further comprises estimating one or both of a time and a financial costs to transfer the first set of aircraft collected weather data.

Example 16 includes the method of any of examples 13-15, wherein evaluating at least the first communication datalink for suitability further comprises determining when the first communication datalink is available for transferring the first set of aircraft collected weather data.

Example 17 includes the method of any of examples 13-16, wherein determining whether the first set of aircraft collected weather data is cumulative to a second set of aircraft collected weather data further comprises: determining a proximity of the first aircraft with respect to the second aircraft.

Example 18 includes the method of example 17, wherein determining whether the first set of aircraft collected weather data is cumulative to a second set of aircraft collected weather data further comprises: comparing a heading of the first aircraft with respect to a heading of the second aircraft.

Example 19 includes the method of any of examples 13-18, wherein determining whether the first set of aircraft collected weather data is cumulative to a second set of aircraft collected weather data further comprises: determining whether a simple weather indicator included with the new weather data disclosure message is consistent with weather information previously provided by the second aircraft.

Example 20 includes the method of any of examples 13-19, wherein the new weather data disclosure message is communicated via a datalink having a narrower bandwidth than the first datalink.

In various alternative embodiments, system elements, method steps, or examples described throughout this disclosure (such as the Ground Based Weather Collection Station, Weather Data Processing System, Weather Information Collection Manager, ATC System, Air-Ground Datalink Manager, or sub-parts thereof, for example) may be implemented using one or more computer systems, field programmable gate arrays (FPGAs), or similar devices comprising a processor coupled to a memory (such as shown in FIG. 1, for example) and executing code to realize those elements, processes, or examples, said code stored on a non-transient data storage device. Therefore other embodiments of the present disclosure may include elements comprising program instructions resident on computer readable media which when implemented by such computer systems, enable them to implement the embodiments described herein. As used herein, the term "computer readable media" refers to tangible memory storage devices having non-transient physical forms. Such non-transient physical forms may include computer memory devices, such as but not limited to punch cards, magnetic disk or tape, any optical data storage system, flash read only memory (ROM), non-volatile ROM, programmable ROM (PROM), erasable-programmable ROM (E-PROM), random access memory (RAM), or any other form of permanent, semi-permanent, or temporary memory storage system or device having a physical, tangible form. Program instructions include, but are not limited to computer-executable instructions executed by computer system processors and hardware description languages such as Very High Speed Integrated Circuit (VHSIC) Hardware Description Language (VHDL).

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:

1. A weather data collection system, the system comprising:
   at least one transceiver configured to communicate with aircraft via one or more datalinks;
   a Weather Data Processing System coupled to the at least one transceiver, the Weather Data Processing System comprising a processor coupled to a memory that stores weather information compiled from aircraft collected weather data;
   wherein the Weather Data Processing System further comprises a Weather Information Collection Manager coupled to the at least one transceiver and the memory;
   wherein the Weather Information Collection Manager is configured to process a new weather data disclosure message received from a first aircraft via the at least one transceiver to determine when the first aircraft has a first set of aircraft collected weather data available for transfer that is either cumulative or noncumulative with respect to weather information previously stored in the memory;
   wherein the Weather Information Collection Manager is further configured to process the new weather data disclosure message received from the first aircraft to determine whether a first datalink of the one or more datalinks is suitable for transferring the first set of aircraft collected weather data; and
   wherein when the first set of aircraft collected weather data is noncumulative and when the first datalink of the one or more datalinks is suitable for transferring the first set of aircraft collected weather data, the Weather Information Collection Manager is configured to cause the Weather Data Processing System to transmit a weather data request to the first aircraft in response to the new weather data disclosure.

2. The system of claim 1, wherein the weather data request requests the first aircraft to transmit the first set of aircraft collected weather data via the first datalink.

3. The system of claim 2, wherein the Weather Data Processing System stores the first set of aircraft collected weather data into the memory.

4. The system of claim 1, wherein the Weather Information Collection Manager determines whether the first datalink is suitable for transferring the first set of aircraft collected weather data based on estimating one or both of a time and a financial costs to transfer the first set of aircraft collected weather data.

5. The system of claim 1, wherein the new weather data disclosure message comprises:
   an Aircraft identification (ID);
   a new weather data indicator;
   a data size field; and
   a simple weather indicator.

6. The system of claim 1, wherein the Weather Information Collection Manager determines whether the first set of aircraft collected weather data is cumulative based on a proximity of the first aircraft with respect to a second aircraft that previously provided at least part of the weather information previously stored in the memory.

7. The system of claim 6, wherein the Weather Information Collection Manager determines whether the first set of aircraft collected weather data is cumulative further based on a comparison of a heading of the first aircraft with respect to a heading of the second aircraft.

8. The system of claim 1, wherein the Weather Information Collection Manager determines whether the first set of aircraft collected weather data is cumulative based on a consistency of a simple weather indicator included with the new weather data disclosure message and weather information previously provided by a second aircraft that provided at least part of the weather information previously stored in the memory.

9. The system of claim 1, wherein the new weather data disclosure message is communicated via a datalink having a narrower bandwidth than the first datalink.

10. A method for weather information management, the method comprising:
    transmitting a new weather data disclosure message from a first a first aircraft, the new weather data disclosure message indicating that a first set of aircraft collected weather data is available for transfer from the first aircraft; and
    when the first set of aircraft collected weather data is determined by a Weather Information Collection Manager to be noncumulative with respect to weather information previously collected and determined that a first datalink is suitable for transferring the first set of aircraft collected weather data, transmitting the first set of aircraft collected weather data upon receiving a weather data request in response to the new weather data disclosure, the weather data request indicating the first datalink is to be used to transmit the first set of aircraft collected weather data;
    wherein the new weather data disclosure message includes at least an aircraft identification (ID) field, a new weather data indicator field, a data size field, and a simple weather indicator field.

11. The method of claim 10, wherein the new weather data disclosure message is communicated via a datalink having a narrower bandwidth than the first datalink.

12. The method of claim 10, further comprising:
    generating the first set of aircraft collected weather data using on-board weather sensors;
    wherein the new weather data disclosure message is transmitted when generation of the first set of aircraft collected weather data is completed.

13. A method for weather information management, the method comprising:
    determining at a ground station weather collection system when a first set of aircraft collected weather data is available for transfer from a first aircraft based on a new weather data disclosure message received from the first aircraft;
    determining whether the first set of aircraft collected weather data is cumulative to a second set of aircraft collected weather data previously generated onboard a second aircraft based on the new weather data disclosure message;
    evaluating at least a first communication datalink for suitability for transferring the first set of aircraft collected weather data based on a data size indicated in the new weather data disclosure message; and
    when the first set of aircraft collected weather data is determined to be not cumulative and the first communication datalink is determined to be suitable:
    selecting the first communication datalink; and
    transmitting a weather data request in response to the new weather data disclosure message, the weather data request indicating that the first datalink is to be used to transmit the first set of aircraft collected weather data.

14. The method of claim 13, wherein the new weather data disclosure message comprises:
an Aircraft identification (ID);
a new weather data indicator;
a data size field; and
a simple weather indicator.

15. The method of claim 13, wherein evaluating at least the first communication datalink for suitability further comprises estimating one or both of a time and a financial costs to transfer the first set of aircraft collected weather data.

16. The method of claim 13, wherein evaluating at least the first communication datalink for suitability further comprises determining when the first communication datalink is available for transferring the first set of aircraft collected weather data.

17. The method of claim 13, wherein determining whether the first set of aircraft collected weather data is cumulative to a second set of aircraft collected weather data further comprises:
determining a proximity of the first aircraft with respect to the second aircraft.

18. The method of claim 17, wherein determining whether the first set of aircraft collected weather data is cumulative to a second set of aircraft collected weather data further comprises:
comparing a heading of the first aircraft with respect to a heading of the second aircraft.

19. The method of claim 13, wherein determining whether the first set of aircraft collected weather data is cumulative to a second set of aircraft collected weather data further comprises:
determining whether a simple weather indicator included with the new weather data disclosure message is consistent with weather information previously provided by the second aircraft.

20. The method of claim 13, wherein the new weather data disclosure message is communicated via a datalink having a narrower bandwidth than the first datalink.

\* \* \* \* \*